(12) United States Patent  (10) Patent No.: US 7,490,387 B2
Hillier  (45) Date of Patent: Feb. 17, 2009

(54) ROPE OR CABLE RETAINER

(76) Inventor: Clyde Hillier, 438 Ridout St., London, ON (CA) N6C 4A1

(*) Notice: Subject to any disclaimer, the term of this patent is extended or adjusted under 35 U.S.C. 154(b) by 0 days.

(21) Appl. No.: 11/672,085

(22) Filed: Feb. 7, 2007

(65) Prior Publication Data

US 2008/0184535 A1 Aug. 7, 2008

(51) Int. Cl.
*F16G 11/00* (2006.01)
*F16B 2/12* (2006.01)

(52) U.S. Cl. ...................................... 24/136 R; 24/523

(58) Field of Classification Search ............... 24/115 G, 24/115 H, 136 R, 523; 269/254 CS; 114/218; 248/229.22, 229.12
See application file for complete search history.

(56) References Cited

U.S. PATENT DOCUMENTS

| 1,493,490 | A | * | 5/1924 | Holzapfel | 114/199 |
| 2,319,377 | A | * | 5/1943 | Wallace et al. | 24/523 |
| 2,614,788 | A | * | 10/1952 | Woodward | 137/637 |
| 6,672,237 | B2 | | 1/2004 | Hillier | |

* cited by examiner

*Primary Examiner*—James R Brittain
(74) *Attorney, Agent, or Firm*—Standley Law Group LLP

(57) ABSTRACT

A rope, cable or other linear tension member is retained along its length by a device 10 having a body 12 with a plunger 18 that is movably located in an internal cavity 14 of the body. The body provides a first surface 16 to engage the tension member and the plunger provides a second surface 24 that is disposed in substantially parallel relationship to the first surface. A biasing means 26 is used to urge the plunger upwardly in the internal cavity, so that the first and second surfaces are urged towards registration. Opposing ends 28, 30 of the body may be shaped in a manner to provide a cleat upon which the tension member may be wound or tied off. Mounting means 32, 34 in the body permit the body to be fixed to a surface.

14 Claims, 2 Drawing Sheets

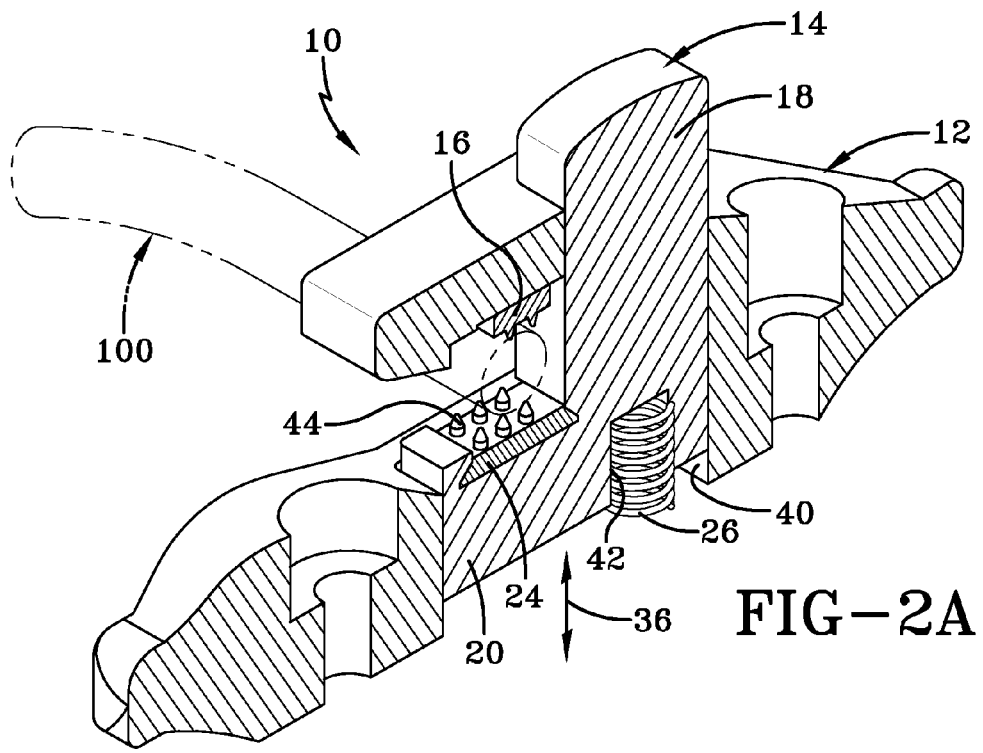
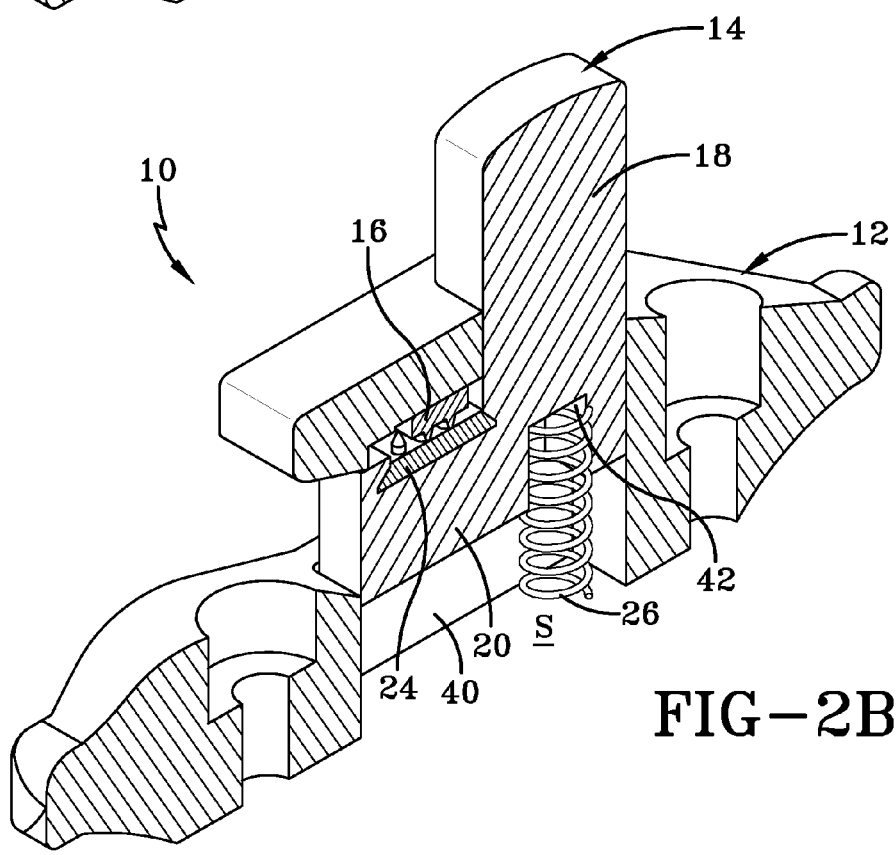

ROPE OR CABLE RETAINER

CROSS-REFERENCE TO RELATED APPLICATIONS

This application claims no benefit of priority.

TECHNICAL FIELD

The embodiments disclosed herein relate to a device for retaining a rope, cable, or similar linear tension member. More particularly, the device provides the capacity to receive such a rope or cable along a length thereof, without requiring access to an end of the linear tension member.

BACKGROUND OF THE ART

For purposes of this application, the term "linear tension member," which may also be referred to as the "tension member," is used to identify the workpiece with which applications of the device will be found. The linear tension member will be understood to encompass ropes, cables, chains and other equivalents. A variety of linear tension members are commonly used, especially in nautical applications, such as to secure a nautical vessel to a dock or similar support structure. Securing such vessels to a dock, for instance, typically requires that knots be tied in the rope. Occasionally, as during inclement weather, it may be difficult to tie the rope as described.

The inventor herein is also the inventor of U.S. Pat. No. 6,672,237 ("Hillier '237"), which describes a device that is useful in retaining a rope or cable, particularly in a nautical application, relative to a surface. The Hillier '237 patent is incorporated by reference as if fully recited herein, especially with regard to its teachings about the prior art that existed before its filing date.

The Hillier '237 device includes a base with a socket for receiving a plunger. A coil spring exerts an upward bias in the socket against the plunger. The base and the plunger each have circular apertures that may be selectively axially aligned when the plunger is depressed against the upward bias, but which are not axially aligned when the upward bias is unopposed.

Because the apertures have closed circular perimeters, an end of the linear tension member must be passed axially through the respective apertures while the plunger in depressed to align the apertures. When the depressing force is released, a shearing force is applied to the linear tension member from the axial misalignment, which frictionally secures the tension member within the device.

In order to secure an object using a linear tension member, the linear tension member is normally attached at one end to the object and at the other end to a fixed support structure. The tension member is normally attached by means of tying an end of the tension member on both the object and the support structure. In many cases, tightening (or loosening) a tension member that is already secured at both ends requires one of the ends to be untied, and, indeed, the Hillier '237 device requires that an end of the tension member be passed through the apertures.

In addition to being unable to accommodate tension members of differing diameters, the known prior art has not provided a device for loosening or tightening a tension member using only access to an intermediate portion of the tension member.

SUMMARY OF THE INVENTION

This and other unmet advantages of the prior art are provided by the present invention useful for releasably securing a tension member described herein comprising: a body upon which is disposed a first surface used to engage a tension member, a means for attaching the first surface to the body, the body further comprising an internal cavity, a means for attaching the body to a mounting surface, a first end and second end; a plunger slidably embodied within the internal cavity, the plunger further comprising an upright portion, a flange upon which is disposed a second surface used to engage the tension member in opposition to the first surface, a means for attaching the second surface to the flange; and a means to upwardly bias the plunger and the second surface in opposition to the body and first surface.

The invention described herein has wide application including, but not limited to, securing airplanes to the ground, articles to vehicles, and aforementioned nautical applications.

Further features of the invention will be described or will become apparent in the course of the following detailed description.

BRIEF DESCRIPTION OF THE DRAWINGS

Novel features and advantages, in addition to those mentioned above, will become apparent to those skilled in the art from a reading of the following detailed description in conjunction with the accompanying drawings wherein identical reference characters refer to identical parts and in which:

FIG. 2a is a side perspective sectional view of the FIG. 1 embodiment, showing the retainer in a first, open position; and FIG. 2b is a side perspective sectional view of the FIG. 1 embodiment, showing the retainer in a second, closed position.

DETAILED DESCRIPTION OF A PREFERRED EMBODIMENT

Figure 1:
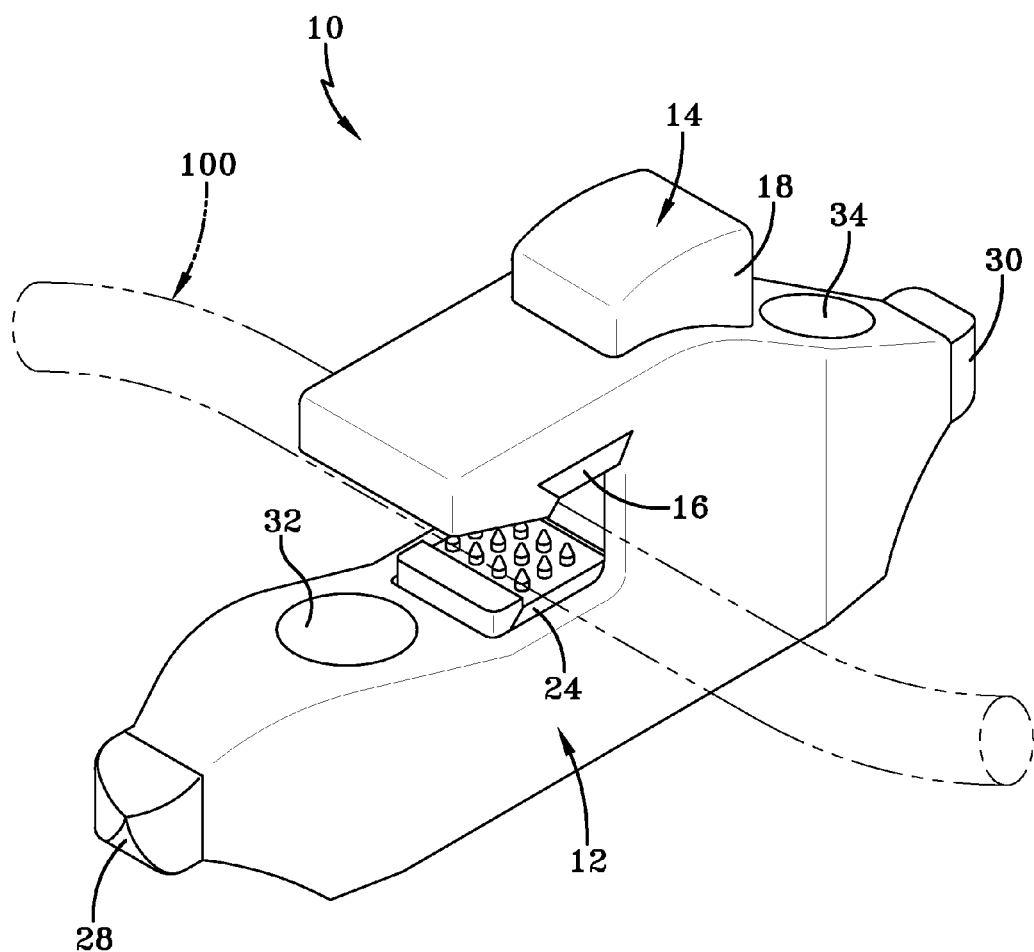
FIG. 1 is a perspective view of an embodiment of a rope or cable retainer, with a rope or cable shown in phantom lining.

Referring first to FIG. 1, a retaining device 10 is shown in perspective view. The device releasably retains a rope, cable or other linear tension member 100, shown in phantom lining, in relation to a surface to which the device is mounted. The device 10 has a body 12 and a plunger 14 that are movable relative to each other. The plunger 14 is positioned within a shaped internal cavity (not shown in FIG. 1) of the body 12. The body 12 has a first surface 16 disposed on it. This first surface 16 frictionally engages the tension member 100, which is also frictionally engaged by a second surface 24, the second surface being disposed on the plunger 14. As will be seen, the plunger 14 is mounted in the body 12, with a portion 18 extending upwardly through the top of the body, so that vertical movement of the plunger effects movement of the second surface 24, but the first and second surfaces 16, 24 remain in substantially parallel relationship.

The illustrated embodiment of the body 12 is also provided with opposing first and second ends 28, 30, which are raised from a surface on which the device 10 may be mounted. In this manner, the ends 28, 30 define a cleat for also receiving the tension member, either by winding or tying off.

To achieve the intended purpose, the device 10 must be affixed to the surface, preferably in a removable manner, so a means is provided in the body 12 for mounting the body to the surface. The illustrated embodiment shows mounting holes 32, 34, through which a fastener, such as a lug bolt, may be received.

A further notable feature of FIG. 1 is the open-sided nature of the gap between the first and second surfaces 16, 24 when they are actively engaging a tension member 100. This open-sided structure allows the tension member 100 to be inserted along an intermediate portion, without the user having access to either end of the tension member. Once inserted into the gap between the first and second surfaces 16, 24, a biasing means (not shown in FIG. 1) compresses the first and second surfaces into the tension member, causing frictional engagement.

FIGS. 2a and 2b show a sectional perspective view of the FIG. 1 device 10, with FIG. 2a showing the tension member 100 being engaged and FIG. 2b showing the device 10 with the tension member removed, thereby showing the device in its respective open and closed configurations. These figures depict the shaped internal cavity 40 in which the plunger 14 is slidably positioned for vertical movement shown by arrow 36. In the illustrated embodiment, plunger 14 has an upright portion 18, a part of which extends out of the top of the body 12. This part of the upright portion 18 provides a site for a user to apply downward compressive force, as with the foot or a hand, on the plunger. In the particular embodiment shown, the upright portion is constrained to sliding lineal upward and downward motion inside this portion of the shaped internal cavity 40 by the corresponding profiles of the upright portion and the shaped cavity transverse to the direction of movement.

The two depictions in FIGS. 2a and 2b also show that the second surface 24 is disposed on a flange 20 that extends radially outwardly from the upright portion 18 of the plunger 14.

As also seen in FIGS. 2a and 2b, the plunger 14 is positioned into the shaped internal cavity 40 through the bottom surface of the body 12. As the internal cavity 40 provides no retaining surfaces to constrain the plunger from downward movement, the affixation of the body to the surface S on which the device 10 is being used is very important. The biasing means, shown in the FIG. 2 depictions as a coil spring 26, has at least an end thereof received in a recess 42 of the plunger, preferably along an axis of the upright portion 18. One end of the biasing means 26 can act against the plunger 14 in this recess, and the other end acts directly against the surface S. Clearly, other biasing means can be selected by one of ordinary skill, a primary selection criterion being the ability of the biasing means to exert sufficient upward force to retain the tension member between surfaces 16, 24.

When the device 10 is mounted to the surface, downward movement of plunger 14 is delimited by the contact of the plunger bottom with the surface. At the other end of the vertical action of the plunger 14, the first and second surfaces 16, 24 will register against each other in the manner shown in FIG. 2b, preferably at a point at which biasing means 26 is still somewhat compressed.

Clearly, the size of body 10 and the areas provided on surfaces 16, 24 will be selected to accommodate the tension member 100, with the device being operative to handle varying sizes. Further assistance in frictional engagement of some tension members is provided by use of pointed cones 44 or other shaping features on one or both of the surfaces 16, 24.

Device 10 may be manufactured from a variety of materials. Because many uses will be nautically related, suggesting that corrosion resistance is in order, synthetic materials, and especially molded thermoplastics, will be useful. However, the contact surfaces 16, 24 are likely to be hardened, and may comprise steel, ceramic or another suitable material. Since many of the preferred biasing means 26 will be metallic, some care should be taken to prevent moisture intrusion to the area surrounding it.

In operation, device 10 is normally closed, as shown in FIG. 2b. Applying downward force to plunger 14 overcomes the upward force of the biasing means 26 and separates surfaces 16, 24, thereby presenting an opening between them for inserting tension member 100. Once inserted, release of the downward force engages surfaces 16, 24 into the tension member, as shown in FIG. 2a, thus retaining and securing tension member 100 without the need for knots. Tension member 100 may be tightened or loosened by applying downward force to plunger 14 and moving the tension member axially (with respective to the axis of the tension member) in the appropriate direction in the gap between the surfaces 16, 24. Or, the tension member 100 may be removed from the device 10 by applying the same downward force and removing the tension member from the gap, without ever having access to the respective end of the tension member.

From the foregoing, it will be seen that this device is one well adapted to attain all the ends and objects set forth herein together with other advantages which are obvious and which are inherent to the structure. Furthermore, it will be understood that certain features and sub-combinations are of utility and may be employed without reference to other features and sub-combinations. This is contemplated by and within the scope of the claims.

What is claimed is:

1. A device for retaining a linear tension member along the length thereof, in relation to a surface, comprising:
    a body, defining a shaped internal cavity open at a top of the body, the body comprising:
        a first surface, adapted for engaging the linear tension member; and
        means for mounting the body to the surface;
    a plunger, movably located in the shaped internal cavity, the plunger comprising:
        a second surface, adapted for engaging the linear tension member; and
        an upright portion extending through the top of the body; and
    means for biasing the plunger upwardly in the shaped internal cavity, the biasing means bearing against the plunger and the surface on which the device is mounted.

2. The retaining device of claim 1, wherein:
    a pair of opposing ends of the body define a cleat for tying off an end of the linear tension member.

3. The retaining device of claim 1, wherein:
    the first and second surfaces are in a substantially parallel facing relationship and remain in such relationship as the second surface moves relative to the first.

4. The retaining device of claim 1, further comprising:
    a means for frictionally grasping the linear tension member, disposed on provided on at least one of the first and the second surfaces.

5. The retaining device of claim 4, wherein:
    the frictional grasping means comprises a metallic plate.

6. The retaining device of claim 5, wherein:
    the metallic plate has a plurality of grasping members projecting substantially normally therefrom.

7. The device of claim 1, wherein:
the mounting means comprises a first and a second hole for receiving a fastener, each of the holes positioned laterally between the shaped internal cavity and on the corresponding end of the body.

8. The device of claim 1, wherein:
the biasing means is a coil spring.

9. The device of claim 1, wherein:
the plunger is slidably constrained to lineal upward and downward motion by the respective profiles of a portion of the shaped internal cavity and the upright portion of the plunger.

10. The device of claim 9, wherein:
upward motion of the plunger is delimited by engagement of the first and second surfaces.

11. The device of claim 10, wherein:
downward motion of the plunger is delimited by engagement of the plunger against the surface on which the device is mounted.

12. The device of claim 1, wherein:
the body and the plunger comprise a moldable thermoplastic.

13. The retaining device of claim 1, wherein:
the second surface is arranged on the plunger on a flange extending laterally from the upright portion.

14. A device for retaining a linear tension member along the length thereof, in relation to a surface on which the device is mounted, comprising:

a body, defining a shaped internal cavity open at a top of the body, the body comprising a first engaging surface, adapted for engaging the linear tension member;

and means for mounting the body to the surface;

a plunger, movably located in the shaped internal cavity, the plunger comprising: a second engaging surface, adapted for engaging the linear tension member; and an upright portion extending through the top of the body; and a spring for biasing the plunger upwardly in the shaped internal cavity, a first end of the spring acting against the plunger and a second end of the spring acting against the surface on which the device is mounted wherein the plunger is slidably constrained to lineal upward and downward motion, the upward motion delimited by engagement of the first and second engaging surfaces and the downward motion delimited by engagement of the plunger against the surface on which the device is mounted.

* * * * *